S. B. ALLEN.
SAFETY DEVICE FOR SPEED CHANGING MECHANISMS.
APPLICATION FILED DEC. 28, 1915.

1,196,752.

Patented Sept. 5, 1916.
2 SHEETS—SHEET 1.

Fig. 1.

INVENTOR=
Stratford B. Allen,
By E. D. Chadwick,
Attorney.

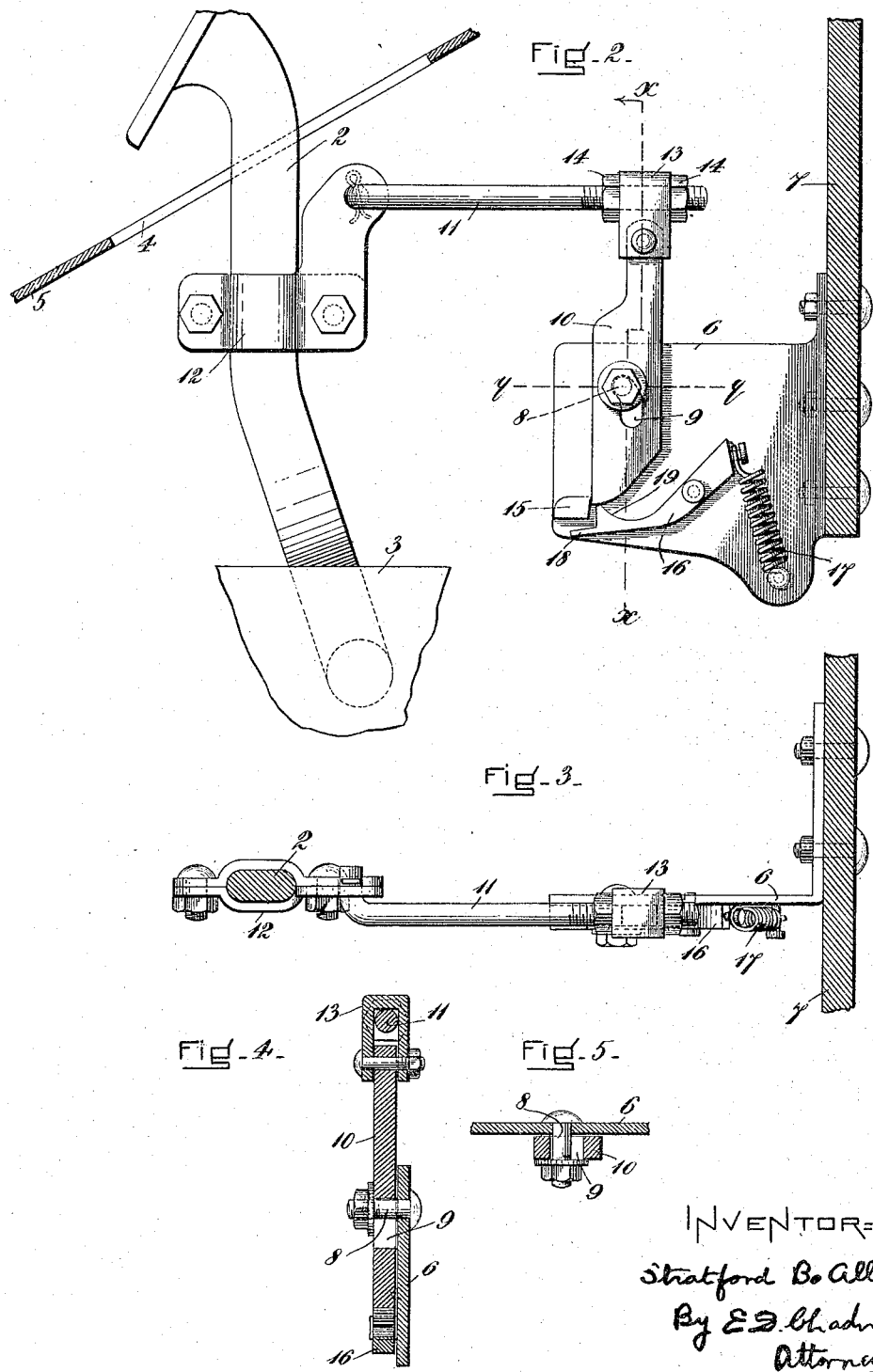

UNITED STATES PATENT OFFICE.

STRATFORD B. ALLEN, OF CAMBRIDGE, MASSACHUSETTS.

SAFETY DEVICE FOR SPEED-CHANGING MECHANISMS.

1,196,752.  Specification of Letters Patent.  Patented Sept. 5, 1916.

Application filed December 28, 1915. Serial No. 69,115.

*To all whom it may concern:*

Be it known that I, STRATFORD B. ALLEN, a citizen of the United States, residing at Cambridge, in the county of Middlesex and State of Massachusetts, have invented new and useful Improvements in Safety Devices for Speed-Changing Mechanisms, of which the following is a specification.

In certain types of automobiles, of which the Ford is a well known example, changes in speed are brought about by means of a gear-shifting mechanism operated by a foot pedal and so constructed that the gears are in the low-speed, neutral and high-speed positions when the foot pedal is at its forward, intermediate and rearward positions, respectively, the pedal being moved into its rearward position by a spring provided for that purpose. It has been found, however, that speed-changing mechanism of the character above referred to is open to the objection that in case the operator presses the foot pedal forward into its intermediate position with the intention of stopping the car quickly, there is danger that the forward movement of the pedal may be continued far enough to throw the gears into the low-speed position, with the result that instead of stopping the car will be forced forward or the engine will be stalled.

The object of the present invention is to overcome the objection above referred to by the provision of means which, when combined with the gear-shifting mechanism, will cause the forward movement of the pedal to be automatically and positively stopped when the gears are in neutral position but will permit the pedal to be subsequently moved farther forward if the pressure on it is first slightly relaxed.

My invention can be readily embodied in an attachment adapted to be applied to existing automobiles without altering any of their parts, and such an attachment as preferably constructed for application to a Ford car is illustrated in the accompanying drawings, in which:

Figure 1 is a side elevation of the attachment as applied to the car, portions of the footboard and dashboard of the latter being shown in vertical section; Fig. 2 is a similar view showing the parts in a different position from those illustrated in Fig. 1; Fig. 3 is a plan view of the attachment in the position shown in Fig. 2; Fig. 4 is a section on the line $x$—$x$ in Fig. 2; and Fig. 5 is a section on the line $y$—$y$ in Fig. 2.

In Figs. 1 and 2 is shown a foot-operated lever 2 pivotally mounted at its lower end in a gear box 3, as in a Ford car, and extending upward through a slot 4 in the footboard 5, with the foot pedal at its upper end located in position to be operated by the driver of the car in the usual way. It is to be assumed that the lever 2 is subject to the action of a spring for moving it into its rearmost position, the illustration of such a spring being omitted for the reason that in a Ford car it is included in the mechanism operated by the lever.

With the lever 2 is combined an attachment comprising, in the form illustrated, a bracket 6 bolted to the rear face of the dashboard 7 below the footboard 5 and carrying a laterally-extending pivot bolt 8 which passes through a longitudinal slot 9 in an arm 10, whereby said arm is adapted to turn on the pivot bolt and also to move upward and downward when in upright position. The arm 10, which is located in the plane of movement of the lever 2, is connected to the lever by means of a rod 11 pivotally mounted at its rear end on a plate 12 clamped on the lever, and carrying at its other end a clip 13 pivoted to the upper end of said arm 10 and located between a pair of nuts 14 whereby it is adjustably clamped on the rod. The bracket 6 also carries a fixed stop 15 and a pivotally-mounted lever 16, the rear portion of which is located directly beneath the arm 10 and tends to move upward under the influence of a spring 17. An extension 18 at the rear end of the lever 16 serves to limit its upward movement by engaging the under side of the stop 15, and when in its uppermost position that portion of said lever which is adjacent to the stop extends upward to a point at least as high as the top of the stop, from which point the upper surface of the lever extends downward and forward, as shown at 19.

The upper end of the slot 9 in the arm 10 has a rearwardly-extending enlargement 20 into which the pivot bolt 8 is adapted to enter, and the distance from the enlargement 20 to the lower end of the arm 10 is such that if said arm is turned on the pivot bolt while the latter lies in said enlargement the lower end of the arm will engage the stop 15, while if said pivot bolt lies in the lower portion of the slot 9 the lower end of the arm 10 can swing past said stop without engaging it.

As thus described the operation is as follows: When the lever 2 is at the limit of its rearward movement the arm 10 and the lever 16 occupy the positions shown in full lines in Fig. 1, in which the pivot bolt 8 is held in the enlargement 20 at the upper end of the slot 9 by the weight of the arm 10 and the rod 11, with the lower end of said arm in front of the stop 15. This position of the parts corresponds to the high-speed position of the gears in the gear box. If now the operator presses the lever 2 forward the corresponding forward movement of the upper end of the arm 10 causes said arm to turn on the pivot bolt, on which it is prevented from moving upward after its lower end comes in contact with the lever 16, because the forward pressure on the upper end of the arm and the frictional resistance to backward movement of its lower end coöperate to maintain said bolt in the enlargement 20. Consequently, as the arm 10 approaches an upright position and its lower end engages the slanting portion 19 of the lever 16, it forces the latter downward until finally the lower end of said arm brings up against the front face of the fixed stop 15, thereby positively arresting the forward movement of the lever 2 with the parts in the position illustrated in Fig. 2. This position corresponds to the neutral position of the gears, any necessary adjustments being effected by clamping the plate 12 at the proper height with respect to the lever 2 and by means of the clamp nuts 14 on the rod 11. If the operator wishes to move the lever 2 still farther forward he first relaxes the pressure on the lever and permits it to move backward slightly, the result of which is to move the upper end of the arm 10 backward until the pivot bolt 8 passes out of the enlargement 20, whereupon the rear end of the lever 16 is immediately moved into its uppermost position by the spring 17 and lifts the arm 10 with it until the lower end of said arm is in position to pass over the top of the stop 15, such lifting movement being permitted by the fact that the pivot bolt 8 now lies in the longitudinal portion of the slot 9. The operator then presses forward again on the lever 2, and as the arm 10 can now turn freely on the pivot bolt the parts move into the position shown in dotted lines in Fig. 1, whereby the gears are brought into the low-speed position. When the lever 2 is permitted to move backward the arm 10 returns to the position first described, its lower end being beveled as at 21 to cause said arm to ride over the stop 15 during its return movement.

It will be seen that the attachment above described provides a safety device which automatically prevents the operator from unintentionally moving the foot pedal forward beyond the intermediate or neutral position, and that the invention is characterized by the employment of coöperating stop members which are brought into engagement by a forward movement of the pedal and are automatically disengaged if the pedal is then moved backward slightly. This characteristic feature of the invention can be embodied in various forms and utilized in connection with various gear-shifting or other speed-changing mechanisms, whether operated by foot or by hand, and it will be evident that the parts employed, instead of having the form of an attachment adapted to be added to existing automobiles, may constitute a component part of the mechanism controlled thereby.

I claim:—

1. In a mechanism of the character described, the combination with a speed-changing lever, adapted to move forward and backward, of coöperating stop members arranged to engage each other and arrest the forward movement of the lever when it reaches an intermediate position, and means for automatically shifting said stop members out of engagement with each other when the lever is moved slightly backward from said intermediate position, thereby permitting further forward movement of said lever.

2. In a mechanism of the character described, the combination with a speed-changing lever, adapted to move forward and backward, of a stop member movable forward and backward with said lever, a fixed stop located in position to be engaged by said stop member when the lever reaches an intermediate position in its forward movement, and means operative with a rearward movement of the lever for shifting the path of movement of the stop member and thereby enabling it to pass said stop.

3. In a mechanism of the character described, the combination with a speed-changing lever, adapted to move forward and backward, of a slotted arm mounted on a pivot passing through the slot therein, means for connecting said arm to the lever, a fixed stop located in position to be engaged by said arm when the lever reaches an intermediate position in its forward movement, and means operative with a rearward movement of the lever for moving said arm lengthwise of its slot and thereby disengaging it from the stop.

4. In a mechanism of the character described, the combination with a speed-changing lever, adapted to move forward and backward, of an upright arm having a longitudinal slot therein and a rearwardly-extending enlargement at the upper end of the slot, said arm being mounted on a pivot passing through the slot, means for connecting the upper end of said arm to the lever, a stop located in position to be engaged by the lower end of the arm when the pivot is located in said enlargement and the lever is in an intermediate position, and a spring-actuated device for lifting said arm when the lever moves backward and thereby disengaging the lower end of the arm from said stop.

5. An attachment of the character described, comprising a bracket carrying a fixed stop, a stop member adapted to be connected to a speed-changing lever and movable into engagement with the stop when the lever reaches an intermediate position in its forward movement, and means for disengaging the stop member and stop when said lever moves slightly backward from its intermediate position.

6. An attachment of the character described, comprising a bracket carrying a fixed stop, an arm pivotally mounted on said bracket, means for connecting said arm to a speed-changing lever, and means for causing said arm to engage the stop when moved in one direction into an intermediate position and for disengaging the arm and stop when the arm is moved in the opposite direction.

7. An attachment of the character described, comprising a bracket, a fixed stop carried thereby, a longitudinally-slotted arm mounted on a pivot carried by said bracket and passing through the slot in the arm, means for connecting the upper end of the arm to a speed-changing lever, and means for causing said arm to engage the stop when moved in one direction into an intermediate position and for disengaging said arm and stop when the lever is moved in the opposite direction.

8. An attachment of the character described, comprising a bracket, an upright arm provided with a longitudinal slot and mounted on a pivot carried by said bracket and passing through said slot, the upper end of the slot being provided with an enlargement adapted to receive the pivot, means for connecting the upper end of the arm to a speed-changing lever, a fixed stop located in position to be engaged by the lower end of the arm when said pivot is located in said enlargement, and a spring-actuated device for lifting said arm and moving it out of engagement with the stop when the pivot moves out of said enlargement.

9. An attachment of the character described, comprising a bracket, an upright arm provided with a longitudinally-extending slot and mounted on a pivot carried by the bracket and passing through said slot, the upper end of the slot being provided with an enlargement adapted to receive the pivot, a rod attached to the upper end of the arm for connecting it to a speed-changing lever, a fixed stop carried by the bracket in position to be engaged by the lower end of the arm when said pivot is located in said enlargement, a lifting device located beneath the lower end of said arm and adjacent to the stop, said lifting device being provided with a slanting upper surface adapted to be engaged and forced downward by the lower end of the arm when the latter moves into engagement with the stop, and a spring for elevating said lifting device.

In testimony whereof, I have hereunto subscribed my name this 27th day of December, 1915.

STRATFORD B. ALLEN.

Witnesses:
E. D. CHADWICK,
JOSEPH T. BRENNAN.

Copies of this patent may be obtained for five cents each, by addressing the "Commissioner of Patents, Washington, D. C."